(12) United States Patent
Pietiläinen

(10) Patent No.: US 11,025,404 B2
(45) Date of Patent: Jun. 1, 2021

(54) ENHANCING SYNCHRONIZATION IN COMPUTER NETWORK

(71) Applicant: NOKIA SOLUTIONS AND NETWORKS OY, Espoo (FI)

(72) Inventor: Antti Olavi Pietiläinen, Espoo (FI)

(73) Assignee: Nokia Solutions and Networks Oy, Espoo (FI)

(*) Notice: Subject to any disclaimer, the term of this patent is extended or adjusted under 35 U.S.C. 154(b) by 18 days.

(21) Appl. No.: 15/575,180

(22) PCT Filed: Jun. 10, 2015

(86) PCT No.: PCT/EP2015/062912
§ 371 (c)(1),
(2) Date: Nov. 20, 2017

(87) PCT Pub. No.: WO2016/198102
PCT Pub. Date: Dec. 15, 2016

(65) Prior Publication Data
US 2018/0145821 A1 May 24, 2018

(51) Int. Cl.
*H04L 7/00* (2006.01)
*H04J 3/06* (2006.01)

(52) U.S. Cl.
CPC .......... *H04L 7/0016* (2013.01); *H04J 3/0641* (2013.01); *H04J 3/0667* (2013.01); *H04L 7/0008* (2013.01)

(58) Field of Classification Search
CPC ....... H04J 3/0635–0682; H04L 7/0008; H04L 7/0016; H04W 56/00–0095
See application file for complete search history.

(56) References Cited

U.S. PATENT DOCUMENTS 8,954,609 B1 2/2015 Holleman et al.
9,271,247 B1* 2/2016 Pearson ................ H04W 56/00
(Continued)

FOREIGN PATENT DOCUMENTS

EP 2782290 A1 9/2014
WO 2013189536 A1 12/2013

OTHER PUBLICATIONS

International Search Report and Written Opinion for International Application No. PCT/EP2015/062912, dated Feb. 15, 2016 (12 pages).

(Continued)

*Primary Examiner* — Pao Sinkantarakorn
(74) *Attorney, Agent, or Firm* — Brake Hughes Bellermann LLP

(57) ABSTRACT

A method, apparatus, and computer program product for operating a network node of a computer network is provided. According to an embodiment, in a first network node of a time synchronization network interconnecting the first network node with at least one second network node of the time synchronization network is detected synchronization of the first network node and the at least one second network node; and in the first network node is determined, at least one criterion for processing at least one packet of a time synchronization protocol wherein said at least one criterion is capable of causing discarding of the at least one packet of the time synchronization protocol when the at least one criterion is fulfilled.

22 Claims, 3 Drawing Sheets

Figure 1:
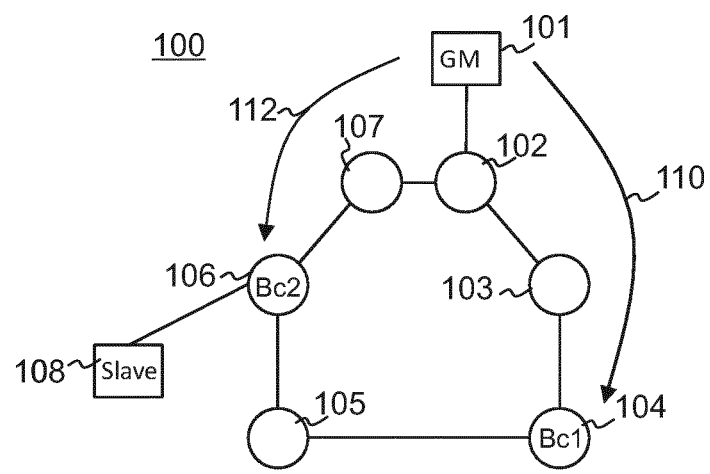

300 Detecting, in first network node of time synchronization network interconnecting first network node with at least one second network node of time synchronization network, synchronization of first network node and at least one second network node.

302 Determining, in first network node, at least one criterion for processing at least one packet of time synchronization protocol wherein said at least one criterion is capable of causing discarding of at least one packet of time synchronization protocol when the at least one criterion is fulfilled.

(56) References Cited

U.S. PATENT DOCUMENTS

2011/0016232 A1* 1/2011 Lee ...................... H04J 3/0685
                                                            709/248
2017/0214479 A1* 7/2017 Heine ................... H04J 3/0673

OTHER PUBLICATIONS

Doug Arnold et al; Enterprise Profile for the Precision Time Protocol with Mixed Multicast and Unicast Messages; draft-ietf-tictoc-ptp-enterprise-profile-05.txt; Feb. 4, 2015; Internet-Draft, TICTOC Working Group; IETF (12 pages).
IEEE Std 1588-2008; IEEE Standard for a Precision Clock Synchronization Protocol for Networked Measurement and Control Systems; Jul. 24, 2008 (289 pages).
ITU-T G.8275.1/Y.1369.1; Precision time protocol telecom profile for phase/time synchronization with full timing support from the network; Jul. 2014 (42 pages).
Office Action for European Application No. 15766053.1, dated Apr. 7, 2021, 7 pages.

* cited by examiner

300 Detecting, in first network node of time synchronization network interconnecting first network node with at least one second network node of time synchronization network, synchronization of first network node and at least one second network node.

302 Determining, in first network node, at least one criterion for processing at least one packet of time synchronization protocol wherein said at least one criterion is capable of causing discarding of at least one packet of time synchronization protocol when the at least one criterion is fulfilled.

Fig. 3

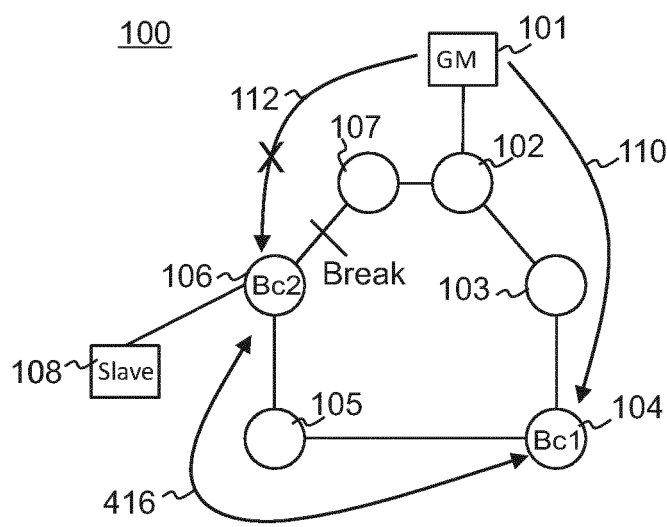

Fig. 4

ENHANCING SYNCHRONIZATION IN COMPUTER NETWORK

CROSS-REFERENCE TO RELATED APPLICATIONS

This application is a national stage entry of PCT Application No. PCT/EP2015/062912 filed Jun. 10, 2015, entitled "ENHANCING SYNCHRONIZATION IN COMPUTER NETWORK" which is hereby incorporated by reference in its entirety.

FIELD

The invention relates to the field of computer networks and, particularly, to enhancing synchronization of computer networks.

BACKGROUND

Modern computer networks may comprise network elements which are synchronized directly or through other network elements to a master clock. When, in a network element, synchronization connection is lost the network element may still prioritize the old synchronization connection instead of creating a new synchronization connection to another closer network element.

BRIEF DESCRIPTION OF THE INVENTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

LIST OF THE DRAWINGS

Figure 2:
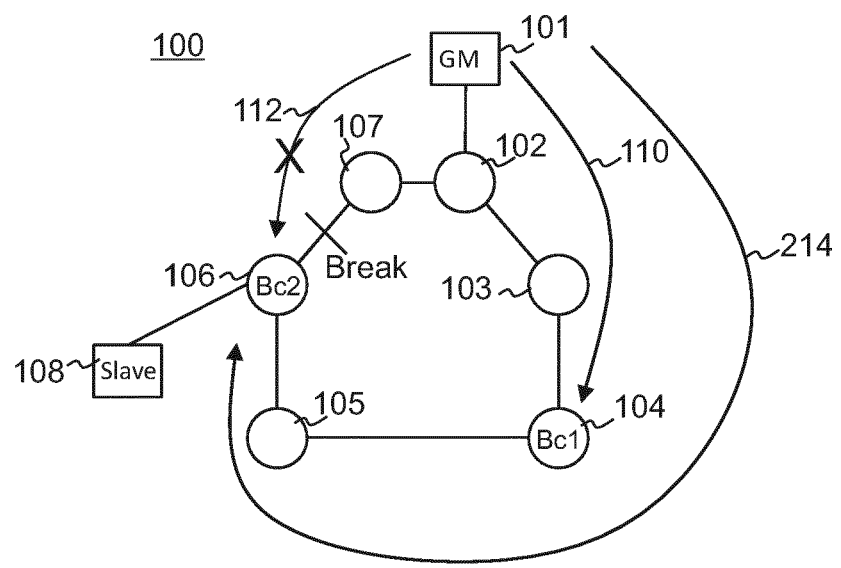
Figure 5:
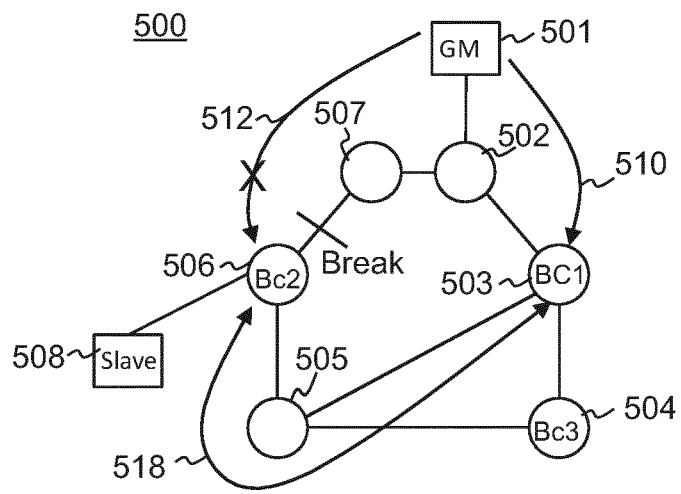

In the following, some aspects of the invention will be described in greater detail with reference to embodiments and the accompanying drawings, in which FIG. 1 presents a network, according to an embodiment;

FIG. 2 presents a network, where a connection between network elements fails;

FIG. 3 illustrate an example of a method to discard time synchronization protocol packets;

FIGS. 4 and 5 present a network, according to an embodiment; and

Figure 6:
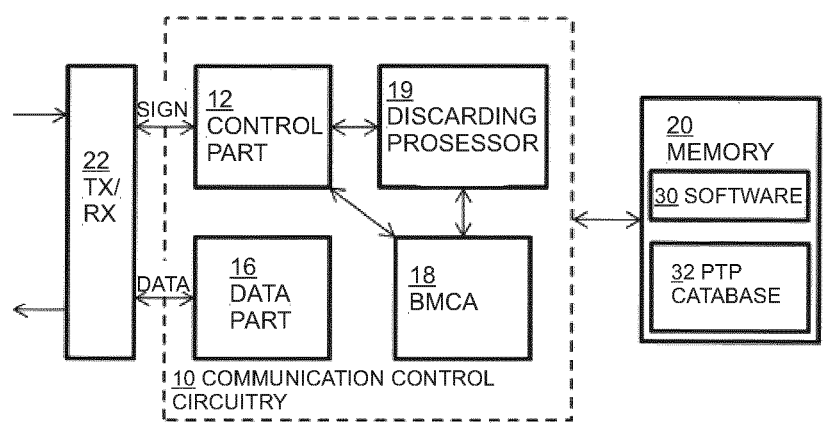

FIG. 6 illustrate apparatus, according to an embodiment.

DESCRIPTION OF EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Precision time protocol (PTP) defined by IEEE standard 1588 is an example of clock synchronization in computer networks, e.g. an Ethernet. The IEEE 1588 standard describes a master-slave architecture for clock synchronization and distribution. An ordinary clock may be considered as a device with a single network connection, and it is either a source (master) or destination (slave) of a synchronization reference. The synchronization reference may be used in carrier synchronization and/or time-stamping of data packets, for example. A clock with multiple network connections is called a boundary clock. A synchronization master is elected for each group of cooperating clock nodes of the computer network. A network node providing the synchronization reference is called a grandmaster. The grandmaster transmits synchronization information to the clocks residing on its group of cooperating clock nodes. If some time synchronization protocol unaware network nodes such as routers or bridges are located between the boundary clocks so called partial timing support scheme is employed. Because the time synchronization protocol unaware network nodes do not contain boundary clock functionality the boundary clocks and the slaves filter the packet delay variation caused by the time synchronization protocol unaware network nodes.

FIG. 1 illustrates an example of a computer network such as a time synchronization network to which embodiments of the invention may be applied. The time synchronization network of FIG. 1 comprises a group 100 of cooperating clock nodes that autonomously selects a master clock to which clocks of the group are synchronized. There may also be other groups that may be connected to each other via edge routers called boundary clocks. Additionally, there may be boundary clocks (Bc1, Bc2) within each group that do not connect to neighbouring group and between the boundary clocks may be one or more time synchronization protocol unaware network nodes.

The group 100 of cooperating clock nodes may comprise at least one master clock 101 called a grandmaster (GM) according to the terminology of the Precision Time Protocol (PTP). The grandmaster provides the synchronization reference primarily used within its group but a grandmaster of a neighbouring group may be used as a backup when the own grandmaster fails. The grandmaster 101 transmits messages 110, 112 such as announce messages that comprise operational parameters of the grandmaster itself. The announce messages may comprise one or more priority parameters of the grandmaster, one or more clock accuracy estimates computed by the grandmaster itself, and/or any classification parameters. The operational parameters may be used in the group to determine the grandmaster to which to synchronize the clocks of the group and to determine a hierarchy amongst the grandmasters, when the group comprises multiple grandmaster candidates. Furthermore the group may comprise one or more network nodes such as boundary clocks 104, 106 that are typically base stations of a wireless communication system such as a cellular communication system, bridges or routers containing PTP boundary clock functionality eliminating on one hand the time error created by the boundary clock itself, and on the other hand run BMCA (best master clock algorithm) or local priority that decides which grandmaster clocks and routes are best for creating shortest path synchronization hierarchy. The group 100 may comprise one or more slave clocks 108 that synchronize to the grandmaster clock either directly or through boundary clocks. The slaves may be routers, personal computers, measurement devices, base stations of a wireless communication system such as a cellular communication system, or any terminals.

In an embodiment at least one boundary clock may be a slave to a grandmaster clock or to another boundary clock. On the other hand at least one slave may be a slave to the boundary clock or to the grandmaster clock. The group may comprise one or more time synchronization protocol unaware network nodes 102, 103, 105, 107 that are intermediate nodes such as routers or bridges for forwarding PTP packets without processing them.

It should be appreciated that FIG. 1 is a simplified illustration of a time synchronization network, and the time synchronization network may comprise substantially more network nodes, e.g. more boundary clocks, more grandmasters or master clocks, more slave devices and more time synchronization protocol unaware network nodes.

The following description contains terminology that originates from the PTP according to the IEEE 1588, but the description is provided in a generic form such that the present disclosure is equally applicable to synchronization methods and protocols other than the PTP.

Boundary clocks initiate a communication with a grandmaster by sending a request for unicast transmission to the grandmaster for announce messages. The announce messages such as Announce are used in a best master clock algorithm to determine the configuration of a master-slave hierarchy in a time synchronization network and to select the grandmaster. Boundary clocks may also initiate communication with each other. The announce message may comprise a parameter such as stepsRemoved representing the number of hops between the boundary clock and the grandmaster. When the boundary clock receives the announce messages from the grandmaster the parameter has value 0. Instead, when the boundary clock receives the announce messages from the other boundary clocks the parameter has value 1 because the boundary clocks increment the value by one. The boundary clocks request synchronization messages such as Sync and delay response messages such as Delay_Resp from the grandmaster to become synchronized because the value 0 is better than 1 in the best master clock selection algorithm. Instead of using the parameter the boundary clocks may use pre-configured priorities such as IP addresses. The grandmaster may have IP address A, boundary clock 106 may have IP address B and another boundary clock 104 may have IP address C. A boundary clock priority table may have higher priority for A and lower priority for C because it is known that the grandmaster is located closer to the boundary clock.

FIG. 2 illustrates a time synchronization network according to the FIG. 1. A break has been occurred between time synchronization protocol unaware network node 107 and second boundary clock 106. The second boundary clock and grandmaster 101 are not anymore able to communicate via the time synchronization protocol unaware network node. As a result protection against node failure may be used and a synchronization path should be changed. If the second boundary clock (Bc2) is losing a direct connection to the grandmaster, it should receive synchronization from first boundary clock 104. However, the second boundary clock prioritize the grandmaster over the first boundary clock (Bc1) and the underlying time synchronization network will maintain a network connection between the second boundary clock and the grandmaster even though the second boundary clock should synchronize to the first boundary clock. As a result, the first boundary clock is acting as an intermediate node and only forwarding messages 214 from the grandmaster to the second boundary clock without processing messages. This causes time error created by the first boundary clock itself.

In a partial timing support scheme, timing packets are subjected to a packet delay variation caused by, for example, queuing due to other traffic. Time accuracy requirements are so demanding that the utilized timing packets should pass time synchronization protocol unaware network nodes without queuing behind even a fraction of another packet. Therefore, every second are sent up to more than hundred timing packets but only a small part of the fastest packets are used for timing. The probability of passing a network without any queuing decreases exponentially as a function of the amount of the time synchronization protocol unaware network nodes. That is why boundary clocks should be located frequently enough along the network for filtering the packets and regenerating the clock signal before passing the timing packets via the time synchronization protocol unaware network nodes. It is essential not to let the timing packets pass via the boundary clock without processing as is the case in FIG. 2 when a brake occurs between a time synchronization protocol unaware network node and a second boundary clock.

Timing packets passing a network may inevitable produce delay which may cause timing error unless it is corrected. The correction may be made by measuring a minimum round trip time (RTT) and assuming that the minimum one-way delays is half of the minimum RTT, which means that the delay is symmetric. The process of inspecting timing messages, such as event messages, to decide whether they should be discarded or not may be associated with processing delays that could cause timing error. By ensuring that the processing delay is the same to both directions, the potential timing error can be eliminated.

FIG. 3 illustrates an embodiment of a flow diagram of a process for ensuring proper synchronization in a time synchronization network by discarding time synchronization protocol packets in boundary clocks for preventing the use of the wrong synchronization source. The discarding of the time synchronization protocol packets may be done by affecting functionality of the boundary clocks without requiring changes in a clock selection algorithm, e.g. a best master clock algorithm (BMCA) of the time synchronization protocol such as PTP. The process may be carried out as a computer program by at least one processor comprised or applicable to the boundary clock. When a break has occurred between a time synchronization protocol unaware network node and a boundary clock, the boundary clock may prioritize a grandmaster over another boundary clock and the underlying time synchronization network may maintain a network connection between the boundary clock and the grandmaster via another boundary clock even though the boundary clock should synchronize to the other boundary clock. Instead of forwarding the time synchronization protocol packets in the other boundary clock they are discarded. As a result of discarding the boundary clock does not receive the time synchronization protocol packets anymore from the grandmaster and may initiate connection with the other boundary clock and receive processed time synchronization protocol packets from the other boundary clock.

In block 300 is detected, in a first network node of a time synchronization network interconnecting the first network node with at least one second network node of the time synchronization network, synchronization of the first network node and the at least one second network node. In an embodiment the time synchronization network may comprise at least one master clock for synchronizing one or more of the network nodes. The time synchronization network may comprise at least two master clocks wherein the different network nodes may synchronize with the different master clocks. In an embodiment the master clock may be a grandmaster and the network node may be a boundary clock. In an embodiment at least one network node may act as a boundary clock through which one or more network nodes may synchronize to the master clock. In an embodiment at least one network node may be a time synchronization protocol aware network node. The time synchronization protocol may be PTP or other applicable time synchronization protocol. In an embodiment the time synchronization network may further comprise at least one time synchronization protocol unaware network node. The time synchronization network may use a partial timing support scheme. In an embodiment the time synchronization network may be a mesh network.

In block 302 is determined, in the first network node, at least one criterion for processing at least one packet of a time synchronization protocol wherein said at least one criterion is capable of causing discarding of the at least one packet of the time synchronization protocol when the at least one criterion is fulfilled. In an embodiment the at least one criterion may comprise at least one of the following: a port number of a connectionless data transfer protocol reserved for the time synchronization protocol, and a message type field in a time synchronization protocol header indicating other than a management message or a message type field in a time synchronization protocol header indicating a value, and a time synchronization protocol domain number of the time synchronization protocol packet.

In an embodiment the port number of the connectionless data transfer protocol reserved for the time synchronization protocol may comprise number 319 and/or 320. The connectionless data transfer protocol may be user datagram protocol (UDP) or any other applicable protocol. The port numbers 319 and 320 may be UDP port numbers reserved for PTP protocol.

In an embodiment a message type field in a time synchronization protocol header indicating other than a management message may cause discarding other than management packets. In an embodiment the message type field in the time synchronization protocol header may indicate a value, wherein the value, other than hex 0xD, may cause discarding other than management packets. The value hex 0xD may indicate message type value of the management packet. In an embodiment the message type field in the time synchronization protocol header indicating other than the management message or the message type field in the time synchronization protocol header indicating the value may be inspected only when the port number of the connectionless data transfer protocol reserved for the time synchronization protocol is 320.

A group of cooperating clock nodes may be assigned with unique domain numbers. In an embodiment the network node may discard the packet if a domain number of the time synchronization protocol packet is the same as a domain number of the first network node.

FIG. 4 illustrates a time synchronization network according to FIG. 2. A break has been occurred between time synchronization protocol unaware network node 107 and second boundary clock 106 preventing the second boundary clock to receive any time synchronization protocol packet messages 112 through said time synchronization protocol unaware network node. A first boundary clock 104 receives the time synchronization protocol packet messages 110 from the grandmaster 101. In the first boundary clock may be determined at least one criterion for processing at least one packet of the time synchronization protocol instead of forwarding them according to the normal forwarding rules. The at least one criterion may be capable of causing discarding of the at least one time synchronization protocol packet when the at least one criterion is fulfilled. The at least one criterion may comprise at least one of the following: a port number of a connectionless data transfer protocol such as UDP reserved for the time synchronization protocol such as PTP, and a message type field in a time synchronization protocol header indicating other than a management message or a message type field in a time synchronization protocol header indicating a value, and a time synchronization protocol domain number of the time synchronization protocol packet. In an embodiment instead of forwarding the time synchronization protocol packets in the first boundary clock they may be discarded according to at least one said criterion. As a result of discarding the packets in the first boundary clock, the second boundary clock does not receive the time synchronization protocol packets anymore from the grandmaster. Therefore, the second boundary clock may initiate connection with the first boundary clock and may include IP address of the first boundary clock to a master table of the second boundary clock. Thereafter, the second boundary clock may receive processed time synchronization protocol packet messages 416 from the first boundary clock.

FIG. 5 illustrates a group of cooperating clock nodes 500 comprising a grandmaster 501, time synchronization protocol aware boundary clocks 503, 504, 506, time synchronization protocol unaware network nodes 502, 505, 507 and a slave clock 508. The time synchronization network is a mesh network comprising a link between the first boundary clock 503 and the time synchronization protocol unaware network node 505. In the mesh network other clocks or nodes may be connected with each other. A break has been occurred between time synchronization protocol unaware network node 507 and second boundary clock 506 preventing the second boundary clock to receive any time synchronization protocol packet messages 512 through said time synchronization protocol unaware network node. A first boundary clock receives the time synchronization protocol packet messages 510 from the grandmaster. In the first boundary clock may be determined at least one criterion for processing at least one packet of the time synchronization protocol instead of forwarding them according to the normal forwarding rules. The at least one criterion may be capable of causing discarding of the at least one time synchronization protocol packet when the at least one criterion is fulfilled. The at least one criterion may comprise at least one of the following: a port number of a connectionless data transfer protocol such as UDP reserved for the time synchronization protocol such as PTP, and a message type field in a time synchronization protocol header indicating other than a management message or a message type field in a time synchronization protocol header indicating a value, and a time synchronization protocol domain number of the time synchronization protocol packet. In an embodiment instead of forwarding the time synchronization protocol packets in the first boundary clock they may be discarded according to at least one said criterion. As a result of discarding the packets, in the first boundary clock, the second boundary clock does not receive the time synchronization protocol packets anymore from the grandmaster. Therefore, the second boundary clock may initiate connection with the first boundary clock and may include IP address of the first boundary clock to a master table of the second boundary clock. Thereafter, the second boundary clock may receive processed time synchronization protocol packet messages 518 from the first boundary clock.

FIG. 6 illustrates an embodiment of an apparatus comprising means for carrying out the above-mentioned functionalities of the network node for discarding time synchronization protocol packets. The apparatus may be the above-mentioned network node such as a boundary clock which complies with PTP specifications or with specifications of another synchronization scheme where the network node may acquire synchronization from a grandmaster. The apparatus may be a bridge or a router, e.g. an edge router configured to connect to at least one network segment. The apparatus may, however, be or may be comprised in another type of network node, e.g. a computer (PC), a measurement device, an industrial device, a base station of a wireless communication system such as a cellular communication system, or a consumer electronic device. According to another aspect, the apparatus carrying out the above-described functionalities is comprised in such a network node, e.g. the apparatus may comprise a circuitry, e.g. a chip, a processor, a micro controller, or a combination of such circuitries in the network node.

Referring to FIG. 6, the apparatus may comprise a communication controller circuitry 10 configured to control communications in the apparatus. The communication controller circuitry 10 may comprise a control part 12 handling control signalling communication with respect to transmission, reception, and extraction of control messages including the announce messages, as described above. The control part 12 may handle communication through multiple communication ports and determine which communication port(s) is/are connected to the neighbouring network segments. The communication controller circuitry 10 may further comprise a data part 16 handling transmission, processing, and reception of payload data according to state-of-the-art data routing and processing procedures. The data part 16 may utilize in the data transfer the synchronization acquired according to principles of the embodiments described herein.

The communication controller circuitry 10 may further comprise the discarding processor circuitry 19 configured to process time synchronization protocol messages received by the control part 12 from a master clock such as a grandmaster. The discarding processor circuitry 19 may be configured to discard at least one time synchronization protocol packet according to at least one criterion. The discarding processor circuitry 19 may be configured to choose the at least one criterion comprising at least one of the following: a port number of a connectionless data transfer protocol reserved for the time synchronization protocol, and a message type field in a time synchronization protocol header indicating other than a management message or a message type field in a time synchronization protocol header indicating a value, and a time synchronization protocol domain number of the time synchronization protocol packet.

The communication controller circuitry 10 may further comprise a master clock selection circuitry 18 configured to select the grandmaster or the boundary clock for the clock synchronization reference. The master clock selection circuitry 18 may employ the BMCA procedure, for example. The master clock selection circuitry 18 may receive from the control part 12 the operational parameters of the grandmasters to be used in the master clock selection.

The circuitries 12 to 19 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 19 or all of them.

The apparatus may further comprise the memory 20 that stores computer programs (software 30) configuring the apparatus to perform the above-described functionalities in the network node. The memory 20 may also store communication parameters and other information needed for the operation of the synchronization and processing and distributing the announce messages. The apparatus may further comprise communication interface components 22 providing the apparatus with communication capabilities within the network segment(s) to which the apparatus is connected. The communication interface components 22 may comprise the communication ports and any standard physical components to realize physical layer connections with other network nodes. The apparatus may further comprise a user interface enabling interaction with the user of the communication device. The user interface may comprise a display, a keypad or a keyboard, a loudspeaker, or the user interface may be a software-based user interface, e.g. a web-based client application.

In an embodiment, the apparatus carrying out the embodiments of the invention in a network node comprises at least one processor and at least one memory including a computer program code, wherein the at least one memory and the computer program code are configured, with the at least one processor, to cause the apparatus to detect, in a first network node of a time synchronization network interconnecting the first network node with at least one second network node of the time synchronization network, synchronization of the first network node and the at least one second network node, and determine, in the first network node, at least one criterion for processing at least one packet of a time synchronization protocol wherein said at least one criterion is capable of causing discarding of the at least one packet of the time synchronization protocol when the at least one criterion is fulfilled In an embodiment, the apparatus carrying out the embodiments of the invention in the network node comprises at least one processor and at least one memory including a computer program code, wherein the at least one memory and the computer program code are configured, with the at least one processor, to cause the apparatus to carry out the functionalities according to any one of the processes of FIGS. 3 to 5. Accordingly, the at least one processor, the memory, and the computer program code form processing means for carrying out embodiments of the present invention in the network node.

In an embodiment, a computer program product is embodied on a distribution medium readable by a computer and comprising program instructions which, when loaded into an apparatus, execute the method according to any one of the processes of FIGS. 3 to 5.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 3 to 5 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units. In an embodiment, a computer program product is embodied on a distribution medium readable by a computer and comprising program instructions which, when loaded into an apparatus, execute the method according to any one of the processes of FIGS. 3 to 5.

The present invention is applicable to computer networks such as packet-based local area networks (LAN) like Ethernet networks but also to other suitable computer networks, e.g. transport networks of cellular communication systems, IP networks or optical transport networks. The protocols used, the specifications of computer networks, their network elements and user terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
   detecting, in a first network node of a time synchronization network interconnecting the first network node with at least one second network node of the time synchronization network, synchronization of the first network node and the at least one second network node, wherein the first network node includes at least a first boundary clock and the second network node includes at least one of a second boundary clock, a slave clock, or a grandmaster clock, wherein the boundary clock is a clock through which one or more network nodes synchronize to the grandmaster clock; and
   determining, in the first network node, at least one rule for processing at least one packet of a time synchronization protocol wherein said at least one rule causes discarding of the at least one packet of the time synchronization protocol, instead of forwarding the at least one packet of the time synchronization protocol to a third network node when the at least one rule is satisfied, wherein the third network node includes at least a third boundary clock, wherein the at least one rule comprises at least one of:
   a port number of a connectionless data transfer protocol reserved for the time synchronization protocol;
   a message type field in a time synchronization protocol header indicating other than a management message or a message type field in a time synchronization protocol header indicating a value; or
   a time synchronization protocol domain number of the time synchronization protocol packet.

2. The method of claim 1, wherein the at least one rule comprises the message type field in the time synchronization protocol header indicating other than the management message or the message type field in the time synchronization protocol header indicating the value.

3. The method of claim 1, wherein the port number of a connectionless data transfer protocol reserved for the time synchronization protocol comprises number 319 and/or 320.

4. The method of claim 1, wherein a domain number of the time synchronization protocol packet is the same as a domain number of the first network node.

5. The method of claim 1, wherein the time synchronization network comprises at least one master clock for synchronizing one or more of the network nodes.

6. The method of claim 5, wherein the network nodes synchronize with different master clocks.

7. The method of claim 5, wherein at least one network node acts as a boundary clock.

8. The method of claim 1, wherein the network nodes are time synchronization protocol aware network nodes.

9. The method of claim 1, wherein the time synchronization network further comprises at least one time synchronization protocol unaware network node.

10. The method of claim 1, wherein the time synchronization network is using a partial timing support scheme.

11. The method of claim 1, wherein at least one packet being discarded is a first packet, and further comprising:
    receiving a connection request from the third boundary block; and
    transmitting a second packet that is processed to the third boundary clock, the second packet being a time synchronization protocol packet.

12. An apparatus comprising:
    at least one processor; and
    at least one memory including a computer program code, wherein the at least one memory and the computer program code are configured, with the at least one processor, to cause the apparatus to:
    detect, in a first network node of a time synchronization network interconnecting the first network node with at least one second network node of the time synchronization network, synchronization of the first network node and the at least one second network node, wherein the first network node includes at least a first boundary clock and the second network node includes at least one of a second boundary clock, a slave clock, or a grandmaster clock, wherein the boundary clock is a clock through which one or more network nodes synchronize to the grandmaster clock; and
    determine, in the first network node, at least one rule for processing at least one packet of a time synchronization protocol wherein said at least one rule is capable of causing discarding of the at least one packet of the time synchronization protocol, instead of forwarding the at least one packet of the time synchronization protocol to a third network node when the at least one rule is satisfied, wherein the third network node includes at least a third boundary clock, wherein the at least one rule comprises at least one of:

a port number of a connectionless data transfer protocol reserved for the time synchronization protocol;

a message type field in a time synchronization protocol header indicating other than a management message or a message type field in a time synchronization protocol header indicating a value; or a time synchronization protocol domain number of the time synchronization protocol packet.

13. The apparatus of claim 12, wherein the at least one rule comprises the message type field in the time synchronization protocol header indicating other than the management message or the message type field in the time synchronization protocol header indicating the value.

14. The apparatus of claim 12, wherein the port number of a connectionless data transfer protocol reserved for the time synchronization protocol comprises number 319 and/or 320.

15. The apparatus of claim 12, wherein a domain number of the time synchronization protocol packet is the same as a domain number of the first network node.

16. The apparatus of claim 12, wherein the time synchronization network comprises at least one master clock for synchronizing one or more of the network nodes.

17. The apparatus of claim 16, wherein the network nodes synchronize with different master clocks.

18. The apparatus of claim 16, wherein at least one network node acts as a boundary clock.

19. The apparatus of claim 12, wherein the network nodes are time synchronization protocol aware network nodes.

20. The apparatus of claim 12, wherein the time synchronization network further comprises at least one time synchronization protocol unaware network node.

21. The apparatus of claim 12, wherein the time synchronization network is using a partial timing support scheme.

22. An apparatus, comprising:

means for detecting, in a first network node of a time synchronization network interconnecting the first network node with at least one second network node of the time synchronization network, synchronization of the first network node and the at least one second network node, wherein the first network node includes at least a first boundary clock and the second network node includes at least one of a second boundary clock, a slave clock, or a grandmaster clock, wherein the boundary clock is a clock through which one or more network nodes synchronize to the grandmaster clock; and means for determining, in the first network node, at least one rule for processing at least one packet of a time synchronization protocol wherein said at least one rule causes discarding of the at least one packet of the time synchronization protocol, instead of forwarding the at least one packet of the time synchronization protocol to a third network node when the at least one rule is satisfied, wherein the third network node includes at least a third boundary clock, wherein the at least one rule comprises at least one of:

a port number of a connectionless data transfer protocol reserved for the time synchronization protocol;

a message type field in a time synchronization protocol header indicating other than a management message or a message type field in a time synchronization protocol header indicating a value; or a time synchronization protocol domain number of the time synchronization protocol packet.

\* \* \* \* \*